Dec. 22, 1959 — H. M. SCHAPPERT — 2,918,460
POLYMERIZATION PROCESS
Filed May 28, 1956
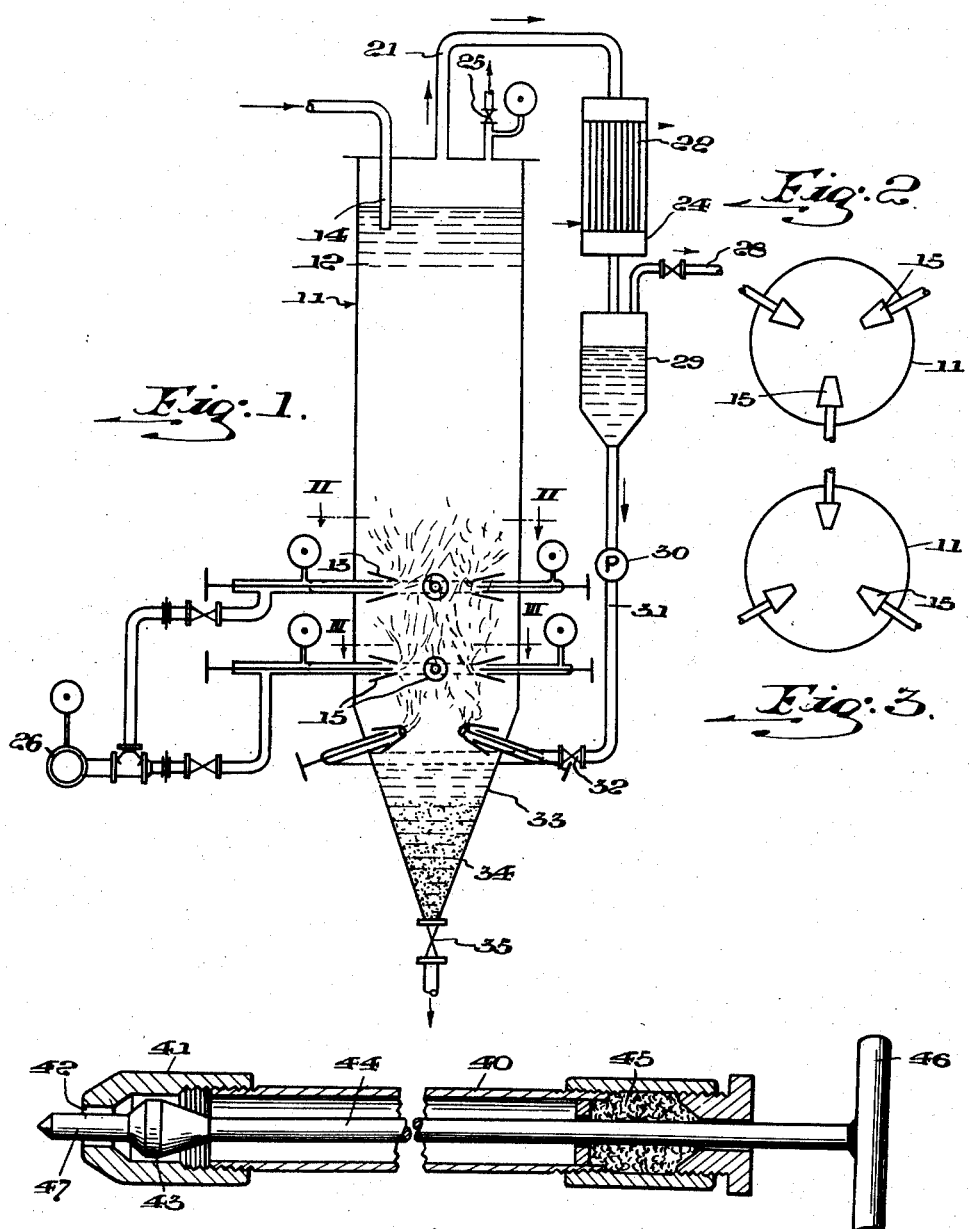
INVENTOR.
HANS M. SCHAPPERT
BY Leon R. Horne
his ATTORNEY United States Patent Office 2,918,460
Patented Dec. 22, 1959

2,918,460

POLYMERIZATION PROCESS

Hans M. Schappert, Pittsburgh, Pa., assignor to Koppers Company, Inc., a corporation of Delaware Application May 28, 1956, Serial No. 587,694

11 Claims. (Cl. 260—94.9)

This invention relates to the catalytic polymerization of ethylene to polyethylene.

It is known that ethylene can be polymerized to solid polyethylene in the presence of a catalyst which is a mixture of (A) and (B) in which (A) has the general formula RR'AlX, in which R is a member selected from the group consisting of hydrogen, alkyl radicals and aryl radicals, R' is a member selected from the group consisting of hydrogen, alkyl radicals, and aryl radicals, and in which X is a member selected from the group consisting of hydrogen, alkyl and aryl radicals, halogen atoms, alkyloxy radicals, aryloxy radicals, secondary amino radicals, secondary acid amide radicals, mercapto radicals, thiophenyl radicals, radicals of carboxylic acids and radicals of sulfonic acids, and in which (B) is a compound of a metal selected from the group consisting of metals of group IV-B, V-B, and VI-B of the periodic system including thorium and uranium at temperatures under the decomposition temperature of the particular catalyst, that is in the order of 100° C. and at pressures of less than 100 atmospheres.

As used herein the term "catalyst" is intended to embrace the admixture of components (A) and (B) as aforedescribed as well as the mixture obtained by separate and simultaneous addition of components (A) and (B) into a reaction zone.

In those instances in which the catalyst components are liquid, they are conveniently introduced as such. Otherwise, suitably these components are slurried or dissolved in the same inert solvent which is used as a reaction medium as hereinafter described such as, for example pentane, cyclopentane, hexane, cyclohexane, heptane, cycloheptane, octane, cyclooctane, nonane, decane, benzene, xylene, decahydronaphthalene, dibutylether, and the like. Particularly useful in the process of this invention are those inert organic solvents which have a density at reaction temperature in the range of 0.55–0.90.

It has been disclosed heretofore that ethylene can be polymerized in the presence of the aforementioned catalysts. One known method includes the steps of first preparing a mixture of the catalyst and an inert solvent and then introducing ethylene into a reactor below the liquid level of the mixture while stirring with mechanical means. For example, the polymerization of ethylene has been accomplished with the aid of mechanical stirring without general regard to the dimensions of the reaction zone. In order to provide sufficient and intimate contact of the catalyst with ethylene generally introduced beneath the surface of the liquid by means of a dip pipe, it has been necessary to stir mechanically the contents of the reaction zone at a relatively rapid speed. Such rapid stirring motion has the disadvantage that it imparts centrifugal forces to the polymer particles throwing them with considerable force against the walls of the reaction zone, causing polymer build-up thereon much as snow drifts build up. Furthermore, the stirrer often causes mechanical troubles either at the stuffing boxes or a build-up on the stirrer blades themselves causing the stirrer to shake and be unbalanced, thereby entailing costly and time-consuming shut-down for repairs.

This invention is an improvement over my copending application Serial No. 519,960, which issued as Patent No. 2,885,389 on May 5, 1959, and which discloses a process for the polymerization of ethylene in a non-mechanically stirred reaction zone containing a boiling inert solvent in which catalyst is continuously added to the upper portion of said zone to flow downwardly; and continuously and simultaneously therewith ethylene is introduced below the surface of said inert solvent to flow countercurrently through the flow of said catalyst. A critical requirement is the maintenance of a liquid level in the reaction zone above the lowest point of ethylene introduction at a distance of at least four times the equivalent diameter of the cross-sectional area of the zone in the plane of said lowest point of ethylene introduction. By means of this particular relationship and corresponding reactor design it is possible to obtain substantially complete ethylene absorption, eliminates the polymer build-up experienced with mechanical stirrers and the lower polymer concentration at the surface of the boiling inert solvent thus lowering to some extent the possibility of entrainment and fouling of the condenser utilized to condense the vapors of the boiling inert solvent. Another feature of my earlier process is that by introducing pure solvent into the reaction zone below the lowest point of ethylene introduction, there is obtained a two-fold advantage, namely (1) the catalyst is removed from the downcoming polymer particles by the solvent and (2) the catalyst is retained in the reaction zone and is contacted with ethylene as the inert solvent flows upwardly to the portion of the reaction zone where ethylene is introduced. The net effect is to make maximum use of a given amount of catalyst by providing the maximum exposure of said catalyst to ethylene.

The present invention concerns a process for polymerizing ethylene in which, through a sudden release of ethylene gas pressure directly into the reaction zone at one or more points, very finely dispersed ethylene gas bubbles having a diameter in the range of 0.01 to 0.5 mm. are obtained, the bulk of the bubbles averaging less than 0.1 mm. in diameter. Due to the highly dispersed state of the ethylene, the rate of ethylene absorption is very rapid and substantially complete as evidenced by the presence of only minor quantities of ethylene in the off-gases. Absorption rate as herein used is defined as ethylene converted to polymer recovered divided by the ethylene introduced as feed. Yield is defined as pounds of polymer per gallon of reactor volume per hour.

The sudden release of the ethylene pressure may be accomplished by any high-pressure nozzle capable of producing the desired gas dispersion, one embodiment being shown in Figure 4 of the drawings.

The effect of the ethylene gas bubble size on the overall polymerization is surprising and completely unexpected. While the degree of ethylene absorption is substantially the same as in my copending application, there are other noteworthy differences. For example, if the ethylene is fed through a nozzle into the reactor, as in my copending application under substantially the same pressure as that prevailing in the reactor, the resulting gas dispersion is less dense because of fewer bubbles. These bubbles are of larger diameter than the finely dispersed bubbles of the invention and due to their higher buoyancy rise more rapidly in the reactor. In order to obtain the degree of absorption illustrated in my copending application special means are required, in particular a relatively high vertical reactor having a small diameter so as to provide a ratio of at least 4 to 1, as mentioned previously. It is also necessary to introduce ethylene at a plurality of cross-sectional planes as illustrated. However, this design has several disadvantages. One major disadvantage of the required high reactor, due principally to its small diameter, is that it favors the entrainment of polymer, resulting in large quantities of surface polymer which is carried into and fouls the condenser. Fouling of the condenser is especially troublesome since for every pound of polymer produced it is necessary to condense many pounds of vaporized solvent, e.g. 14 pounds per pound of polymer in the case of pentane as solvent.

With respect to the gas dispersion means, one or more nozzles can be employed. If a plurality are employed, they may be in the same or in different planes. The nozzles are designed and arranged in such a fashion that the selected number produces and delivers finely dispersed ethylene gas bubbles of the desired size to substantially that entire reactor area wherein the bulk of the polymerization occurs. Due to the permissible larger reactor diameter, the arrangement of the nozzles is such that virtually no impingement of ethylene on the reactor walls occurs, thus eliminating polymer build-up thereon.

The advantages flowing from the improved process of this invention, in addition to those already mentioned, and in addition to those of copending application Serial No. 519,960, now Patent No. 2,885,389, are manifold. Whereas the process of the copending application utilizing a vertical reactor requires a liquid level in the reaction zone above the lowest point of ethylene introduction at a distance of at least four times the equivalent diameter of the cross-sectional area of the zone in the plane of the lowest point of ethylene introduction, this is not required in the present process since a ratio as low as 2 can be employed with facility. In consequence, the height of the vertical reactor can be reduced considerably, thereby eliminating the necessity of jacket cooling, an important economic consideration. The diameter can also be enlarged as mentioned previously, thus avoiding to a great degree the problem of polymer entrainment. Additionally, while the degree of ethylene absorption in the present process is substantially 100% as in my copending application, the rate of ethylene absorption is increased notably.

In order to realize the desired ethylene gas bubble size certain pressure ratios, those of reactor pressure to gas inlet pressure, are required and are explained in greater detail below. Using high-pressure nozzles, as in the present invention, to obtain this pressure relationship, the resulting gas bubbles have an average diameter ranging from 0.01 to 0.5 mm., the bulk of the bubbles averaging less than 0.1 mm., which is on the average one whole order of magnitude smaller than obtained when inlet gas pressure and reactor pressure are the same. Due to the reduced size of these bubbles, they are present in much larger numbers representing a much larger surface for catalyst contact. Since they are less buoyant, their rising velocity is lower and they are spread over a larger cross-sectional area of the reactor.

Another favorable effect is that by reducing the height of the reactor and increasing its diameter, all of the nozzles can be placed in one or at most two cross-sectional planes. Additionally, due to the increased diameter of the reactor and the positioning of the nozzles, there is far less tendency of impingement of gas bubbles on the reactor walls, thus reducing polymer build-up thereon. Specifically, the larger diameter permits positioning of the nozzles so that they protrude into the reactor for such a distance that the dispersed gas does not impinge upon the reactor wall. As a result there is formed directly on the reactor wall an annular space which protects the wall against undesired reaction thereon. This annular space also serves as a path for the descent of the polymer to the conical portion of the reactor.

Another advantage of the present reactor design is in the arrangement of the high-pressure nozzles in one or at most two horizontal planes. In this way, the distribution curve of particle size and molecular weight of the polymer produced is spread over a smaller range.

Yet another feature of this invention resides in the fact that for a given polymer, catalyst or ethylene particle there is a controlled, determinable residence time in the reaction zone which is shorter and even more readily controlled than in my copending application. For example, by the present process it is possible to produce polyethylene of even more uniform particle size and molecular weight than in my copending application. This is the result of the rapid rate of ethylene absorption and the much shorter residence of the polymer particles after formation in the reactor due to the reduced path to the apex of the cone where polymer is removed from the system. The comparative examples found below serve to illustrate this feature. As a result of the high ethylene absorption rate, there is another advantage in that there is no need to recycle off-gases. In other processes, it is economically unwise to vent these gases since they contain substantial quantities of ethylene due to lower ethylene absorption. Since there is no need for recycle, a further advantage of the present process is the elimination of apparatus means for recycling unreacted gas. In short, since the off-gas contains a minimum of ethylene, it can be advantageously and economically vented without the disadvantage that exists when large quantities of unreacted ethylene are required to be recycled carrying along other impurities, which impurities build up gradually to levels where the characteristics of the polymers are impaired or the absorption rate decreased.

Still another advantage of the present process is that the high-pressure nozzles permit the mixing of an inert gas such as nitrogen with the ethylene feed gas for the purpose of suppressing the boiling point of the solvent, particularly when the selected solvent has a boiling point above the decomposition point of the catalyst employed. Due to the excellent dispersion of the ethylene and inert gas mixture local overheating is prevented.

As an additional new and novel feature of this invention, the reactor is provided with an inverted cone-shaped portion at its lower end as illustrated in the drawing. The purpose of this conical section is dual in that it prevents the settling of polyethylene particles on the steep walls of the cone and concentrates the slurry in the apex which is especially advantageous when product is released at short-time intervals. More specifically, the polymer particles settle in the cone following Stokes' law (Perry's Handbook "Chemical Engineering Handbook," 3rd edition, page 1019). Due to the slope of the wall the particles readily fall to the apex, that is in the direction of the quick-opening valve. This quick-opening valve can be operated intermittently at regularly spaced intervals, for instance every 30 seconds, or can be set to give the highest concentration in a steady flow. The high concentration is an economic advantage in the further processing of the polymer slurry.

In the practice of the present invention the establishment of required gas pressures and reactor pressures are important considerations in order to insure the proper ethylene dispersion in the reaction zone. The nozzle pressure is particularly important. Generally, it is necessary that the nozzle pressure absolute be from 1.3 to 2.5 times the reactor pressure absolute. These pressures are in large measure dependent upon the solvent selected. The correlation between reactor pressure and nozzle pressure for two representative solvents is shown in the following table.

| Solvent | Reactor Pressure | | Nozzle Pressure | | | |
| --- | --- | --- | --- | --- | --- | --- |
| | p.s.i.g. | p.s.i.a. | Minimum | | Maximum | |
| | | | p.s.i.a. | p.s.i.g. | p.s.i.a. | p.s.i.g. |
| Pentane | 22 | 36.7 | ×1.3=47.7 | 33.0 | ×2.0=73.4 | 58.7 |
| Cyclohexane | 3 | 17.7 | ×1.3=23.0 | 8.3 | ×2.0=35.4 | 20.7 |

If it is necessary to operate as in the case of some solvents, i.e. cyclohexane, at a pressure higher than 3.0 p.s.i.g., the above-mentioned method of adding an inert gas to the ethylene feed can be used advantageously whereby the required nozzle pressure can be determined using the above shown relationship.

While operating temperatures can be varied within certain limits, they are generally determined by the decomposition temperature of the catalyst and accordingly are restricted thereby to a range below the catalyst decomposition point.

Referring to the drawings,

Figure 1 is a vertical cross-section illustrating one schematic embodiment of the present invention.

Figure 2 is a horizontal cross section taken on lines II—II of Figure 1.

Figure 3 is a horizontal cross section taken on lines III—III of Figure 1.

Figure 4 is a horizontal cross section of a nozzle of Figure 1.

A substantially vertical reaction zone 11, is shown containing a boiling inert solvent 12. Catalyst is introduced through dip pipe 14 below the level of the solvent 12 and flows downwardly through the reaction zone. Ethylene feed gas is introduced by means of suitable dispersing means, for example the plurality of high-pressure nozzles 15 illustrated, at points such that the level of inert solvent is at least 2.5 times the equivalent diameter of the cross-sectional area of the plane in which the ethylene is introduced. As used herein, the term "equivalent diameter" is used in the sense set forth at page 44 of the 2nd edition of "Elements of Chemical Engineering" by Badger & McCabe, McGraw-Hill Book Company, New York and London (1936). Ethylene is introduced in the embodiment shown at 2 planes.

As the catalyst and ethylene are contacted in the presence of the inert solvent, an exothermic polymerization occurs which causes the inert solvent to boil, the vapors of which are led through a conduit 21 to a reflux condenser 22 where they are condensed and controlled in a sump 24. Means (not shown) are also provided for mixing ethylene feed gas with an inert gas such as nitrogen for the purpose of suppressing the boiling point of the solvent in situations where the selected solvent has a boiling point higher than the decomposition point of the particular catalyst. The reflux condenser is cooled by any suitable medium, such as, for example, water. A pressure release valve 25 is provided for the control of the pressure of the system. Also provided is a valve 26 for controlling the nozzle pressure of the ethylene feed gas. Each of the nozzles is provided with such means. Means 28 are provided for venting uncondensables. A catchpot 29 is employed to collect condensed solvent whence it is pumped by pump 30 via the conduit 31 to a selected level in the reaction zone which is below the lowest point of ethylene introduction and situated so that it benefits the descending polyethylene particles in the manner described previously. Valve 32 is provided in the conduit 31.

As the polymer is formed upon contact of the highly dispersed ethylene gas bubbles with catalyst, it descends through the reaction zone, contacting more ethylene until it reaches the plane of the actual gas dispersing means 15, namely, the high-pressure nozzles and undergoes further polymerization. As the polymer descends into the conical portion it contacts inert solvent 12 flowing upwardly from the point of introduction and is washed thereby to remove as much catalyst as possible therefrom as evidenced by the low ash content of the polyethylene polymer. Descending still further, the polymer enters the conical portion 33 of the reaction zone which has an angle of at least 55° and preferably 65–70° and is then collected as a slurry 34 of maximum concentration. This slurry is removed from the settling zone through quick opening valve 35 which is operated at intervals insuring highly concentrated slurry and polyethylene separated from the liquid component of the slurry by any suitable means such as, for example, centrifugation.

While the reaction zone 11 shown is of circular cross-section in which instance the equivalent diameter is equal to the diameter, the process of this invention can be carried out in substantially vertical reaction zone of any shaped cross-section such as, for example, square, rectangular, triangular, oval, and the like. Advantageously, the zones are unobstructed as any obstructions such as, for example, baffles, give rise to the possibility of pocketing or polymer build-up. In contrast to my copending application wherein it is disclosed that the reaction zone, because of its height, may be advantageously jacketed so as to remove heat, the reactors of the present invention are not subject to this optional arrangement since. Because of the reduced height of reactor and, therefore, the reduced area of exothermic reaction, jacketing is not required.

Figures 2 and 3 show the ethylene feed nozzles arranged in two cross-sectional horizontal planes of the reactor. In each plane three ethylene feed nozzles are arranged, each nozzle spaced 120° apart from the other and all six nozzles of the two planes arranged so that they form 60° angles from each other.

Figure 4 shows horizontal cross-section of a preferred nozzle comprising a nozzle chamber 40 with a removable gas dispersion head 41 having a discharge port 42. The degree of fine dispersion of the liquid from the dispersion head is effected by a valve 43 on the interior of the dispersion head. The valve is adjustable toward and from the port by a stem 44 extending through nozzle chamber 40 to the exterior thereof through a packing gland 45 and is provided with a handle 46 to adjust the valve 43 toward and from the port. The valve is also provided with a rod 47 which extends through the port with an unobstructed clearance completely encircling it to provide an annular port for the dispersion of the gas. And tendency of the nozzle to clog with polymer is minimized by adjustment of the stem by means of the handle.

The following examples are given by way of illustration and not by way of limitation.

*Example I*

In this run a vertical reactor having an upper cylindrical section of 16 feet and a lower conical section with an angle of 70°, and having a 5 foot diameter, is equipped at the top thereof with a non-return reflux condenser and at the apex of the conical portion with a quick-opening valve. The reactor is filled to approximately 90% of its capacity with pentane, more specifically, to a level of about 18 feet above the aforementioned quick-opening valve, the quantity of pentane being about 2,400 gallons. The sump of the reflux condenser is attached to a pump which delivers pentane to the reactor at a height of approximately four feet above said valve.

The ethylene feed nozzles are arranged in two cross-sectional horizontal planes of the reactor as illustrated in Figure 2. Catalyst, introduced through a dip pipe extending slightly below the pentane surface at a rate of 7.2 pounds per hour, comprises a 1:1 molar ratio of diethylaluminum chloride and titanium tetrachloride. Ethylene is injected through each of six ethylene feed nozzles situated in the above-mentioned two planes in an amount of 1,050 pounds per hour, each nozzle delivering the same quantity, that is, 175 pounds per hour. The inside pressure of the reactor is controlled at 22 p.s.i.g. corresponding to a boiling point of the pentane at 64° C. The delivery pressure of the ethylene from the ethylene purification plant is 100 p.s.i.g. and the pressure immediately before the nozzles is approximately 70 p.s.i.g. The pressure ratio therefor is equivalent to $$\frac{70+14.7}{22+14.7}=2.3$$

In this way a nearly perfect dispersion of the ethylene feed gas is obtained, resulting in an absorption of 97% of the ethylene introduced.

Exothermic reaction occurs immediately upon introduction of the ethylene feed gas. The heat of reaction is removed by the boiling pentane. Approximately 15,200 pounds of pentane per hour are evaporated, condensed and returned to the system from the condenser sump by means of a pump. Thirty-five hundred pounds of pentane as make-up for that removed as polyethylene slurry is introduced with the catalyst as described below. By means of a pressure release valve as illustrated, the pressure in the system is maintained as above-mentioned at approximately 22 p.s.i.g.

At the end of approximately 15 minutes after the start of the ethylene addition quick-opening valve at the apex of the cone is opened intermittently for two to three seconds each minute. There is removed from the reactor by this means approximately 1,000 pounds of polyethylene per hour with 3,500 pounds of pentane corresponding roughly to a slurry of approximately 1.5 pounds of polyethylene per gallon of pentane. The slurry is vented into a pressurized vessel and the polyethylene is separated from the liquid pentane. Off-gas is released from the system. This gas consists of approximately 30 pounds ethylene and 20 pounds of other gases, for example methane, nitrogen, carbon dioxide, carbon monoxide, etc.

The recycled pentane is divided in two parts, one part is injected into the upper part of the cone as mentioned above and serves to wash the sinking polyethylene particles as they settle to the bottom of the cone. In this manner, a minimum amount of catalyst is consumed, the effect of which is a polyethylene product having a minimum of ash content. The other pentane part is injected at the surface of the reactor liquid to ensure a layer of pure pentane.

In the foregoing specific embodiment of the invention 0.42 pound of polyethylene per one gallon reactor volume and one hour are obtained. Considering that the reactor is only 90% full of liquid, the ratio of height to diameter (related to the upper cross-sectional plane) is about 2.7.

*Example II*

For comparative purposes a reactor is selected such to give a production of 840 pounds of polyethylene per hour. Such a reactor, described in copending application Serial No. 519,960, has a diameter of 2.5 feet, a height of 35 feet, and is operated with a liquid content of 1,320 gallons.

In order to produce 840 pounds of polyethylene per hour in accordance with the present invention, a reactor having the following dimensions is employed:

Diameter of cylindrical section _____ feet__ 3.5
Length of cylindrical section _____ do____ 12
Length of conical section _____ do____ 5
Angle of cone _____ 70°

Ethylene is introduced into the last described reactor through four high-pressure nozzles arranged in one horizontal cross-sectional plane positioned 90° apart and polymerization conducted in the manner of Example I. The cross-sectional plane of the nozzles is ½ foot above the lower end of the cylindrical section of the reactor and the liquid content of the reactor during the run is 970 gallons. The pressures, ethylene feed and reactor, are the same as in Example I.

The yield from the reactor of the invention is 840/970=0.87 pound of polyethylene per gallon reactor volume per hour. In contrast, the yield from the first reactor is 840/1320=0.63 pound of polyethylene per gallon reactor volume per hour. This represents an unexpected increase in yield of 36%, a significant improvement and a major economic advantage.

While the foregoing examples illustrate solely the use of a catalyst which is an admixture of diethylaluminum chloride and titanium tetrachloride, it will be realized that the polymerization of this invention can be conducted in the presence of any of the catalysts described broadly in column 1 of the specification.

Among the preferred catalysts are the diethylaluminum chloride-titanium tetrachloride (1:1 molar ratio) as well as the di-iso-butylaluminum chloride-titanium tetrachloride (1:1 ratio) mixtures. Further mixtures of titanium tetrachloride and di-iso-butylaluminum hydride, triethylaluminum, tributylaluminum and trioctylaluminum give superior results. Titanium oxychloride and titanium acetylacetonate when substituted for titanium tetrachloride give excellent results. Preferably these catalysts are utilized in amounts of about 5–15 millimols per liter solvent. Broadly, the molar ratio of component (A) to component (B) can be varied in the range of from about 0.5:1 to 12:1 to yield a variety of polyethylenes. Preferably the ratio is in the range 0.75:1 to 2:1.

The various catalyst mixtures, embraced by the description of (A) and (B) supra can be substituted in Examples I and II to yield substantially similar results. Of course, variation of catalyst components, amount and molar ratio will affect the molecular weight of the polyethylene produced. The catalyst can be introduced into the reaction zone either as a mixture of components (A) and (B) or these components can be introduced in separate streams in amounts to produce the desired ratio and amount of catalyst in the reaction zone. Substitution of similar quantities of 1:1 molar ratio catalyst admixtures of titanium tetrachloride and di-iso-butylaluminum chloride, di-iso-butylaluminum hydride, triethylaluminum, tributylaluminum, and trioctylaluminum in the foregoing examples for the titanium tetrachloridediethylaluminum chloride there used yields substantially similar results as to the amount of polyethylene produced per unit time per unit reactor volume.

Similarly, such inert solvents as hexane, heptane, propane, xylene and the like and mixtures thereof, can be utilized and the boiling point varied in the manner aforedescribed.

The rate at which ethylene can be polymerized utilizing the process of this invention is limited only by the rate at which flooding will occur in whatever type and size reaction zone the polymerization is conducted in. Provided the aforedescribed liquid level is maintained at a height above the lowest point of ethylene introduction as compared to the equivalent diameter of the reaction zone in the plane of ethylene introduction, it is possible to polymerize ethylene at a maximum rate of introduction approaching but, of course, not equaling that rate at which flooding effect occurs.

As mentioned above, substantially vertical reactors of cross-sections other than circular cross-sections can be utilized in place of the apparatus having a circular cross-section illustrated in Examples I and II. It will be understood that regardless of the particular shape, the perimeter of the cross-sectional area of the apparatus will equal the "wetted perimeter" utilized in determining equivalent diameter since in all instances the reactor at any plane of ethylene introduction will be filled with inert solvent.

While the invention has been described with reference to particular embodiments thereof, it will be understood that in its broadest aspects the invention may be variously embodied within the scope of the invention as set forth herein and in the appended claims.

I claim:

1. In a process wherein a vertical reaction zone of substantial cross-sectional area and having a catalyst medium comprised of said catalyst in an inert liquid hydrocarbon solvent is utilized for the polymerization of ethylene at a temperature below the catalyst decomposition temperature and under pressure of less than 100 atmospheres to solid polymers of polyethylene, said catalyst being a mixture of (A) and (B) in which (A) has the general formula RR'AlX, in which R is a member selected from the group consisting of hydrogen, alkyl radicals and aryl radicals, R' is a member selected from the group consisting of hydrogen, alkyl radicals, and aryl radicals, and in which X is a member selected from the group consisting of hydrogen, alkyl and aryl radicals, secondary acid amide radicals, halogen atoms, alkyloxy radicals, aryloxy radicals, secondary amino radicals, mercapto radicals, thiophenyl radicals, radicals of carboxylic acids and radicals of sulfonic acids, and in which (B) is a compound of a metal selected from the group consisting of metals of group IV–B, V–B, and VI–B of the periodic system including thorium and uranium; the improvement which comprises introducing said ethylene as highly dispersed bubbles of small diameter within the range of from 0.01 to 0.5 millimeters into said medium at a location below the liquid level thereof at least two times but less than four times the equivalent diameter of said cross-sectional area, whereupon said bubbles rise in said medium to contact said catalyst and form said polymers which then descend through the reaction zone, contacting said descending polymers with further of said bubbles to cause said polymers to undergo further polymerization, and thereafter contacting the descending polymers with a countercurrently flowing stream of solvent to wash said polymers.

2. A process of claim 1 in which the catalyst is a 1:1 molar ratio mixture of diethylaluminum chloride and titanium tetrachloride and in which these components are introduced separately.

3. A process of claim 1 in which the catalyst is a 1:1 molar ratio mixture of di-iso-butyl chloride and titanium tetrachloride and in which these components are introduced separately.

4. A process of claim 1 in which the catalyst is a 1:1 molar ratio mixture of di-iso-butylaluminum hydride and titanium tetrachloride and in which these components are introduced separately.

5. A process of claim 1 in which the catalyst is a 1:1 molar ratio mixture of triethylaluminum and titanium tetrachloride and in which these components are introduced separately.

6. A process of claim 1 in which the catalyst is a 1:1 molar ratio mixture of tributylaluminum and titanium tetrachloride and in which these components are introduced separately.

7. The process of claim 1 wherein said ethylene is introduced into said medium at a second location below said first named location.

8. The process of claim 1 wherein the temperature of the solvent is at its boiling temperature so that the temperature of the reaction is maintained constant despite the exothermic heat of polymerization due to boiling the solvent and the removal of said exothermic heat as latent heat of vaporization of the solvent.

9. The process of claim 1 wherein the polymer, after the washing with the solvent, is flowed through a zone of continuously decreasing cross-sectional area in the direction of flow to concentrate the polymer as a slurry, and the slurry withdrawn from the latter zone.

10. The process of claim 9 in which catalyst in an amount corresponding to the catalyst inherently withdrawn with the slurry is introduced immediately below the level of the solvent in the reaction zone whereby the catalyst flows counter-current to the flow of ethylene.

11. The process of claim 10 wherein the solvent vapors are condensed and reintroduced at a point below the point of introduction of ethylene vapors as said stream of solvent.

References Cited in the file of this patent

UNITED STATES PATENTS

| | | |
|---|---|---|
| 2,719,143 | Van Dijk et al. | Sept. 27, 1955 |
| 2,755,324 | Mueller | July 17, 1956 |

FOREIGN PATENTS

| | | |
|---|---|---|
| 533,362 | Belgium | May 16, 1955 |